(12) United States Patent
Matsuura et al.

(10) Patent No.: US 9,098,199 B2
(45) Date of Patent: Aug. 4, 2015

(54) DATA RECEIVER, CLOCK GENERATION DEVICE, AND METHOD FOR CONTROLLING DATA RECEIVER

(71) Applicant: FUJITSU LIMITED, Kawasaki-shi, Kanagawa (JP)

(72) Inventors: Hideyuki Matsuura, Sendai (JP); Hironobu Hongou, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/016,675

(22) Filed: Sep. 3, 2013

(65) Prior Publication Data

US 2014/0140460 A1 May 22, 2014

(30) Foreign Application Priority Data

Nov. 20, 2012 (JP) ................................ 2012-254642

(51) Int. Cl.
- *H03D 3/24* (2006.01)
- *G06F 5/06* (2006.01)
- *H04L 7/033* (2006.01)

(52) U.S. Cl.
CPC . *G06F 5/06* (2013.01); *H04L 7/033* (2013.01)

(58) Field of Classification Search
CPC ......... G06F 5/06; H04L 1/0072; H04L 25/02; H04L 65/607; H03L 7/08; H03M 11/00; H03M 13/00; H03M 13/2707
USPC .......... 375/316, 327, 324, 376; 714/751, 758, 714/764, 766, 776, 786, 798, 799, 812
See application file for complete search history.

(56) References Cited

U.S. PATENT DOCUMENTS 6,839,322 B1 * 1/2005 Ashwood Smith ........... 370/235

FOREIGN PATENT DOCUMENTS

JP 2000-323982 11/2000

* cited by examiner

*Primary Examiner* — Rahel Guarino
(74) *Attorney, Agent, or Firm* — Fujitsu Patent Center

(57) ABSTRACT

A data receiver includes a writing unit that receives transmission data including live data and excessive data for adjusting a signal length to store the live data in a storage unit, an AND circuit that generates a first signal indicating the positions of the live data and the excessive data in the signal length of the transmission data, a signal converting unit that generates a second signal indicating positions at which positions of the excessive data in the first signal are rearranged at certain intervals in the signal length, a digital phase locked loop (DPLL) unit that smoothes the positions of the live data in the second signal to generate a third signal indicating the timing to read the live data in the signal length, and a reading unit that reads the live data stored in the storage unit by using the third signal.

8 Claims, 7 Drawing Sheets

DATA RECEIVER, CLOCK GENERATION DEVICE, AND METHOD FOR CONTROLLING DATA RECEIVER

CROSS-REFERENCE TO RELATED APPLICATION

This application is based upon and claims the benefit of priority of the prior Japanese Patent Application No. 2012-254642, filed on Nov. 20, 2012, the entire contents of which are incorporated herein by reference.

FIELD

The embodiments discussed herein are directed to a data receiver, a digital phase locked loop (DPLL) device, and a method for controlling the data receiver.

BACKGROUND

Multiplexing in digital transmission utilizes a pulse stuffing system. The pulse stuffing system synchronizes a plurality of signals that are different in transmission speed. To be more specific, a transmission-side device adjusts the insertion frequency of a stuffing pulse (also referred to as an "excessive pulse") to be inserted into various kinds of signals to synchronize signals, and multiplexes signals into which the stuffing pulse is inserted to transmit to a reception-side device. At this time, the transmission-side device also transmits the information of the stuffing pulse to the reception-side device. The reception-side device removes, in demultiplexing signals received, the stuffing pulse from the signals to reproduce original signals. A transmission frame transmitted from the transmission-side device also includes control information such as over head (OH), forward error correction (FEC) in addition to the stuffing pulse.

Furthermore, the transmission-side device transmits a write enable (WE) signal for differentiating information except for actual transmission data (referred to as "pure signal" in some cases) such as the over head or the forward error correction and the pure signal to the reception-side device with the transmission frame. The reception-side device obtains a logical product of the WE signal and Line_CLK to extract a pulse string corresponding to pure communication information bits. Hereinafter, the pulse string in the above-mentioned state is referred to as "Gapped Clock" in some cases. Thereafter, the reception-side device smoothes the Gapped Clock to extract a clock for data reproduction.

In order to smooth the Gapped Clock, a digital phase locked loop (DPLL) having a low cut-off frequency is generally used. To be more specific, the cut-off frequency of the DPLL is set to several hertz or less (1 Hz or less, for example) to reduce the noise of the Gapped Clock thus obtaining the quality of a clock capable of being used for clock reproduction.

However, when the cut-off frequency is set to 1 Hz in starting each device, a pull-in time in the DPLL becomes long. Accordingly, at the time of starting the device, the following procedures are performed; that is, the DPLL is operated for a short period of time in a high speed operation mode using a high cut-off frequency of hundreds of hertz for pulling in, sufficiently pulled in until the target frequency and thereafter, the processing of the DPLL advances to an operation using the low cut-off frequency. The above-mentioned two-step operation ensures the reduction of the pull-in time and the attainment of excellent clock quality.

Furthermore, there is a technique for reducing the effect of noises of reference signals and reducing the pull-in time, the technique lowering the cut-off frequency of a low pass filter (LPF) to detect fluctuations in frequency and generating control data that follow the fluctuation in frequency; see Japanese Laid-open Patent Publication No. 2000-323982, for example.

However, in the Gapped Clock, a connection portion between the trailing "FEC" of a preceding frame and the leading "over head" of a succeeding frame constitutes a large gap. In this respect, in an operation mode using the low cut-off frequency steadily utilized, the cut-off frequency is low and hence, the DPLL fails to respond to a gap component. Therefore, a DPLL output constitutes a signal from which the gap component is removed; that is, a smoothed signal. In contrast, in an operation mode using a high cut-off frequency, the DPLL responds to the gap component. In this case, the DPLL output constitutes a signal containing the gap component. Accordingly, in the operation mode using the high cut-off frequency, the DPLL output is continuously influenced by the gap and hence, a frequency deviation is continuously caused.

Therefore, to consider a case where the above-mentioned two-step-operation technique is used, when changing to the operation mode using the low cut-off frequency at a timing that a large frequency deviation is caused, an operation mode is changed to the operation mode using the low cut-off frequency while maintaining the large frequency deviation. In this case, a large phase difference from a center frequency corresponding to the frequency deviation is processed with the low cut-off frequency thus causing the large phase difference corresponding to the frequency deviation over a prolonged period of time.

A data receiver includes first-in first-out (FIFO) for absorbing the difference between transmission reception amounts of data input and output. The FIFO is operated with a clock generated in the DPLL. When the phase difference from the center frequency is large, less data amount stored in the FIFO may result in communication failure. Therefore, when the phase difference is large, the data amount stored in the FIFO is increased. In that case, there exists the possibility that circuits become large or line delay occurs.

In this manner, in the above-mentioned technique, the use of the high cut-off frequency for high-speed pulling in may result in the increase of the phase difference and the increase of the capacity of the FIFO and hence, it is difficult to allow the high-speed pulling in and noise reduction simultaneously.

Furthermore, also in the technique lowering the cut-off frequency of the LPF to detect fluctuations in frequency and generating control data that follow the fluctuation in frequency, the increase in phase difference due to the effect of the gap when the operation mode is changed is unconsidered. Therefore, even when this technique is used, it is difficult to avoid the increase in phase difference and the increase in FIFO capacity due to the occurrence of the gap when the high cut-off frequency is used for performing the high-speed pulling in. That is, it is difficult to allow the high-speed pulling in and noise reduction simultaneously.

SUMMARY

According to an aspect of an embodiment, a data receiver includes: a data receiving unit that receives transmission data including live data that is actual data to be transmitted or received and excessive data for adjusting a signal length, and stores the live data in a storage unit; a first signal generating unit that generates a first signal indicating positions of the live data and the excessive data in the signal length of the transmission data; a signal converting unit that generates a second signal indicating positions at which positions of the excessive data in the first signal are rearranged at certain intervals in the signal length; a digital phase locked loop (DPLL) unit that generates a third signal indicating the timing to read the live data in the signal length by smoothing the positions of the live data in the second signal; and a reading unit that reads the live data stored in the storage unit by using the third signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Here, the data receiver, the DPLL device, and the method for controlling the data receiver that are disclosed in the present application are not limited to the following embodiments.

[a] First Embodiment

Figure 1:
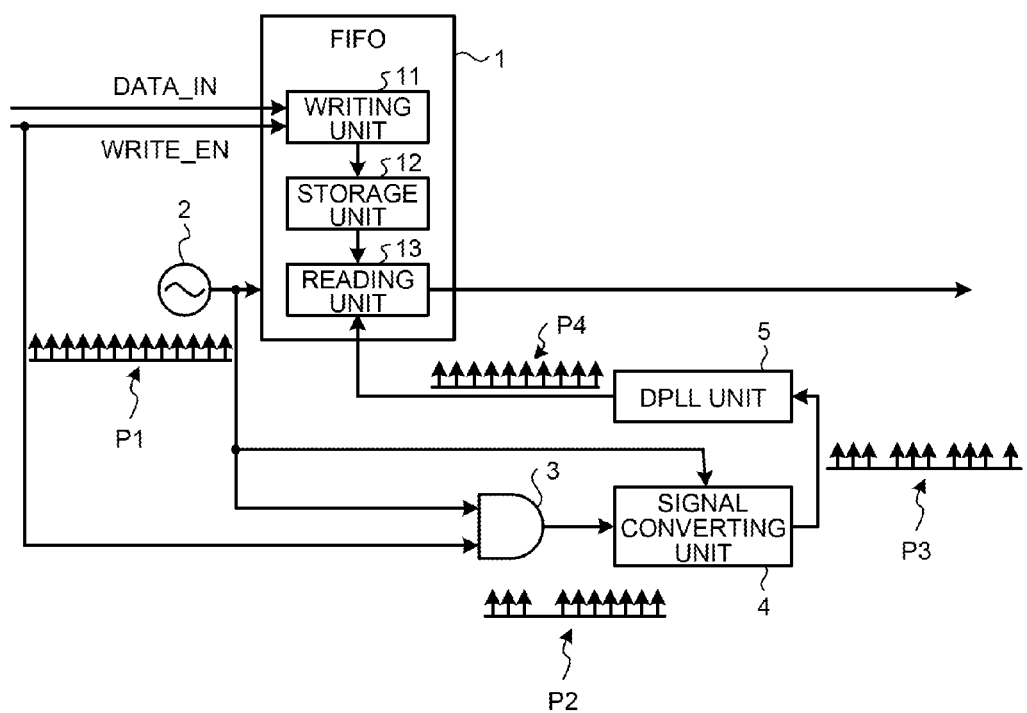
FIG. 1 is a block diagram illustrating one example of a data receiver according to a first embodiment.

FIG. 1 is a block diagram illustrating one example of the data receiver according to the first embodiment. As illustrated in FIG. 1, the data receiver according to the present embodiment has a FIFO 1, an oscillator 2, an AND circuit 3, a signal converting unit 4, and a DPLL unit 5.

The FIFO 1 has a writing unit 11, a storage unit 12, and a reading unit 13.

The storage unit 12 is a memory device such as a random access memory (RAM).

The writing unit 11 accepts the input of transmission data and a write enable signal from external devices. The transmission data includes a payload including live data that is data to be transmitted from a data source and control information such as over head or front error correction (FEC). Furthermore, the payload includes a stuffing pulse that is an excessive pulse for adjusting the length of the payload. The live data is actual data to be transmitted or received. For example, the live data is data other than the stuffing pulse or the like in the payload of the transmission data. A set of data including one over head, one payload, and one front error correction is referred to as one frame. Furthermore, the write enable signal includes information for differentiating the live data and signals other than the live data in the transmission data. For example, for example, in both the transmission data and the clock, the write enable signal becomes "High" at a position where the live data is included in the transmission data (hereinafter referred to as "the position of the live data") and "Low" at a position other than the position of the live data. In FIG. 1, "DATA_IN" indicates the input of the transmission data, and "WRITE_EN" indicates the input of the write enable signal.

The writing unit 11 compares the write enable signal with the transmission data to extract the live data from a position in the transmission data, the position corresponding to the position of the live data indicated by the write enable signal. Furthermore, the writing unit 11 stores the live data extracted in the storage unit 12. In this time, the FIFO 1 accepts the input of Rx_CLK that is a reference clock output from the oscillator 2, and the writing unit 11 is operated with Rx_CLK.

The reading unit 13 accepts the input of Tx_CLK that is an operation clock for reading data from the DPLL unit 5 mentioned later. Furthermore, the reading unit 13 reads the live data stored in the storage unit 12 by using Tx_CLK as an operation clock. Thereafter, the reading unit 13 outputs the data read. The data output is used for subsequent data processing. For example, the data output is provided to users.

The reading unit 13 reads data from the storage unit 12 by using Tx_CLK received from the DPLL unit 5 and hence, the amount of data input to the FIFO 1 becomes comparable with the amount of data output from the FIFO 1. Accordingly, it is possible to avoid a case that excessive data is accumulated or no data is accumulated in the FIFO 1.

The oscillator 2 generates a reference clock. Furthermore, the oscillator 2 outputs the reference clock to the FIFO 1, the AND circuit 3, and the signal converting unit 4. A signal P1 in FIG. 1 indicates the reference clock.

The AND circuit 3 accepts the input of the write enable signal. Furthermore, the AND circuit 3 accepts the input of the reference clock from the oscillator 2.

The AND circuit 3 obtains a logical product of the write enable signal and the reference clock that are received thereby. The AND circuit 3 obtains the logical product of the write enable signal and the reference clock and hence, a Cm pulse is generated, the Cm pulse being a pulse signal such that the write enable signal becomes "High"; that is, the clock corresponding to the position of the live data in the transmission data becomes "High". Furthermore, the AND circuit 3 outputs the Cm pulse obtained to the signal converting unit 4. The AND circuit 3 corresponds to one example of "first signal generator". The Cm pulse corresponds to one example of "first signal".

A signal P2 in FIG. 1 is the Cm pulse. In the Cm pulse, a signal indicating that data is not stored; that is, pulses each of which has the value of "Low" are unevenly distributed. Hereinafter, in the Cm pulse, the signal indicating that data is not stored is also referred to as "stuffing pulse" in the same manner as the case of the transmission data. For example, in a place of the consecutive over head and forward error correction between a payload and a payload, there exist stuffing pulses consecutively. The place of consecutive stuffing pulses in the Cm pulse constitutes a gap of the clock. That is, as indicated by the signal P2, there exists the gap.

Figure 2:
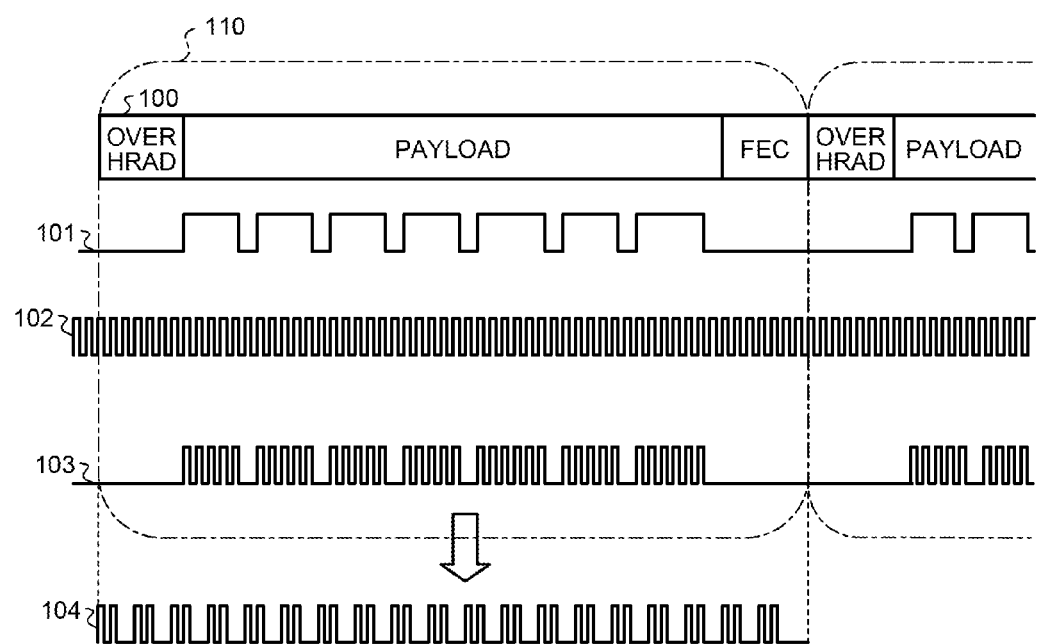
FIG. 2 is a view for explaining the transition of the position of a stuffing pulse.

FIG. 2 is a view for explaining the transition of the position of a stuffing pulse. In FIG. 2, each portion surrounded by a dashed dotted line 110 indicates the transition of a clock signal corresponding to one frame. As a signal is transmitted over a plurality of frames, there exist not only one frame but also consecutive frames.

The data receiver according to the present embodiment receives transmission data 100 and write enable signals 101. Live data is included at the position of the payload corresponding to a part of the write enable signal 101 that is "High" in the transmission data 100. Furthermore, the write enable signal 101 has consecutive stuff pulse in a place of the consecutive over head and forward error correction (FEC) of the transmission data 100. In this manner, in a state of the write enable signal 101, the stuff packets are distributed in one frame thus generating gaps.

The oscillator 2 generates a reference clock 102. Furthermore, the AND circuit 3 obtains the logical product of the write enable signal 101 and the reference clock 102. Accordingly, the AND circuit 3 acquires an m-bit client data entity (Cm) pulse 103. In addition, the AND circuit 3 outputs the Cm pulse 103 to the signal converting unit 4.

Figure 3:
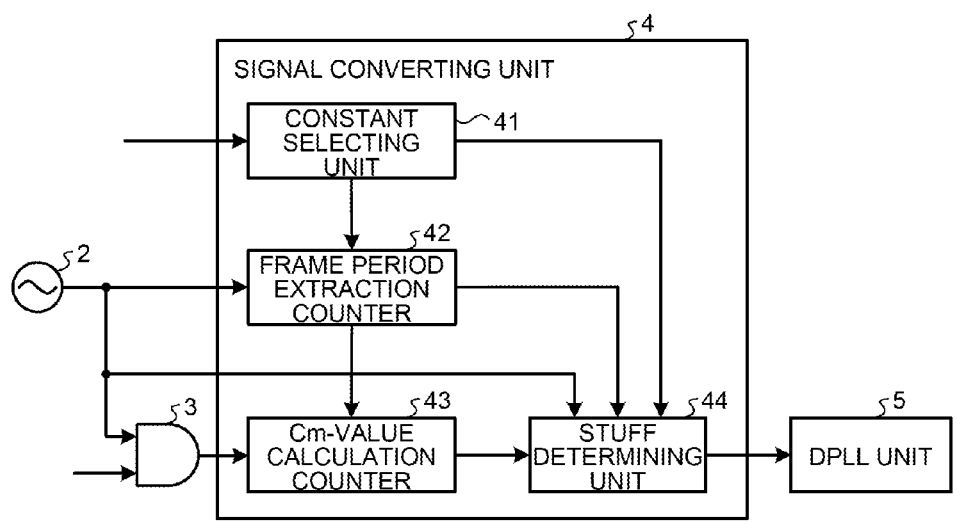
FIG. 3 is a block diagram illustrating a signal converting unit in detail.

FIG. 3 is a block diagram illustrating a signal converting unit in detail. As illustrated in FIG. 3, the signal converting unit 4 has a constant selecting unit 41, a frame period extracting counter 42, a Cm-value calculation counter 43, and a stuff determining unit 44.

The constant selecting unit 41 accepts, for example, the input of the total number of clocks corresponding to transmission data for one frame from the outside through the input operation of a user; that is, the input of the total number of clocks per one frame. The total number of clocks is the number of the reference clocks included in the over head, the payload, and the forward error correction. The total number of clocks is 16,320, for example. Here, when the total number of clocks is fixed, the constant selecting unit 41 may store the certain clocks therein. The constant selecting unit 41 outputs the total number of clocks per one frame received to the frame period extraction counter 42 and the stuff determining unit 44.

The frame period extraction counter 42 accepts the input of the total number of clocks per one frame from the constant selecting unit 41. Furthermore, the frame period extraction counter 42 sequentially accepts the input of the reference clocks from the oscillator 2. The frame period extraction counter 42 increments, when accepting the input of one clock of the reference clocks, the counter value thereof by one. Accordingly, the frame period extraction counter 42 counts the number of clocks received. Furthermore, the frame period extraction counter 42 outputs, when the counter value reaches the total number of clocks, a trigger pulse to the Cm-value calculation counter 43 and the stuff determining unit 44. Accordingly, the frame period extraction counter 42 notifies the Cm-value calculation counter 43 and the stuff determining unit 44 of the timing of counting the end clock of one frame and the timing of counting the beginning clock of a subsequent frame. That is, the frame period extraction counter 42 notifies the Cm-value calculation counter 43 and the stuff determining unit 44 of the period in each frame.

The Cm-value calculation counter 43 accepts the input of the Cm pulse from the AND circuit 3. Furthermore, the Cm-value calculation counter 43 accepts the input of a trigger pulse from the frame period extraction counter 42.

The Cm-value calculation counter 43 counts, in the wake of the input of the trigger pulse, the number of pulses each having the value of "High" in the Cm pulse; that is, the number of pulses each corresponding to the position of the live data in the transmission data, until a subsequent trigger pulse is input. The Cm-value calculation counter 43 counts the number of pulses each having the value of "High" in the Cm pulse between a trigger pulse and the subsequent trigger pulse. Hereinafter, the number of pulses counted by the Cm-value calculation counter 43 is referred to as "CM value".

Furthermore, the Cm-value calculation counter 43 outputs the Cm value obtained to the stuff determining unit 44.

The stuff determining unit 44 accepts the input of the total number of clocks per one frame from the constant selecting unit 41. Furthermore, the stuff determining unit 44 accepts the input of a trigger pulse from the frame period extraction counter 42.

Figure 4:
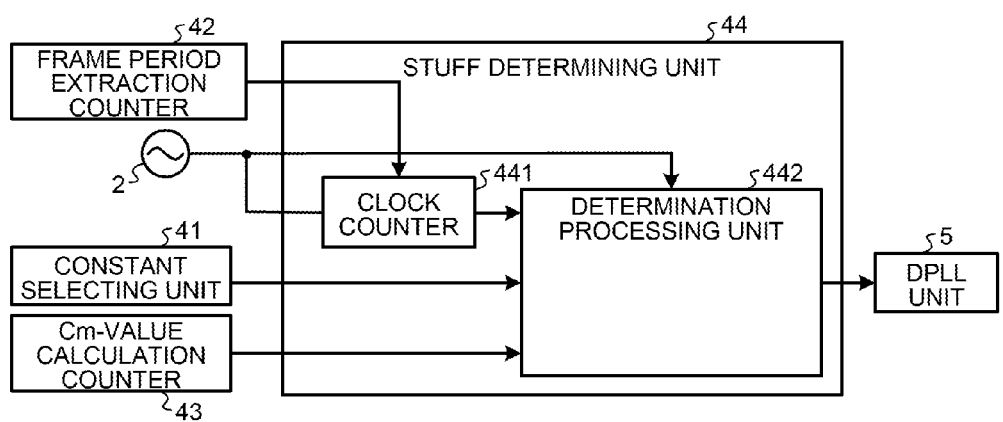
FIG. 4 is a block diagram illustrating a stuff determining unit in detail.

FIG. 4 is a block diagram illustrating the stuff determining unit in detail. The stuff determining unit 44 has a clock counter 441 and a determination processing unit 442.

The clock counter 441 receives the reference clocks input from the oscillator 2 one by one. Furthermore, the clock counter 441 receives a trigger pulse input from the frame period extraction counter 42.

The clock counter 441 counts, in the wake of the reception of a trigger pulse, the reference clocks one by one and increments the counter value thereof one by one. The clock counter 441 counts the number of clocks received until a subsequent trigger pulse is received and outputs the number of clocks counted thereby to the determination processing unit 442. Furthermore, the clock counter 441 outputs, when receiving the subsequent trigger pulse, the number of clocks counted thereby to the determination processing unit 442 and thereafter, resets the counter value thereof. Thereafter, the clock counter 441 restarts to count the reference clocks from one. That is, the clock counter 441 notifies the determination processing unit 442 of the number of clocks at the timing of receiving the reference clock in one frame period. The clock counter 441 repeats the count of the above-mentioned reference clocks for every frame periods.

The determination processing unit 442 accepts the input of the reference clock from the oscillator 2. The determination processing unit 442 is operated with a reference clock received from the oscillator 2.

Furthermore, the determination processing unit 442 accepts the input of the number of clocks counted by the clock counter 441. Here, the number of clocks counted by the clock counter 441 is referred to as "J". Furthermore, the determination processing unit 442 receives the total number of clocks per one frame that are input from the constant selecting unit 41. Here, the total number of clocks per one frame is referred to as "Tb". In addition, the determination processing unit 442 receives a Cm value input from the Cm-value calculation counter 43. Here, the Cm value is referred to as "Cm".

The determination processing unit 442 multiplies the number of clocks counted by the clock counter 441 by the Cm value and divides the multiplication result thereof by the total number of clocks per one frame to obtain a remainder left. That is, the determination processing unit 442 calculates an expression such that J×Cm/Tb to obtain a remainder left. Here, the remainder left by calculating the expression such that J×Cm/Tb is referred to as "R".

Furthermore, the determination processing unit 442 compares the remainder (R) obtained with the Cm value (Cm). When the remainder obtained is equal to or greater than the Cm value (R≥Cm), a pulse generated at the timing of the number of clocks (J) counted by the clock counter 441 is set to "Low". That is, the determination processing unit 442 outputs a stuffing pulse at the position of the J-th clock in one frame. Furthermore, when the remainder obtained is smaller than the Cm value (R<Cm), the determination processing unit 442 sets a pulse generated at the timing of the number of clocks (J) counted by the clock counter 441 to "High". That is, the determination processing unit 442 outputs a pulse indicating the existence of data at the position of the J-th clock in one frame. Accordingly, the determination processing unit 442 outputs a pulse signal in which the stuffing pulses unevenly distributed in the Cm pulse are arranged at fixed intervals in one frame; that is, the determination processing unit 442 outputs a pulse signal in which the stuffing pulses are equally spaced. Here, the equal-spacing of the stuffing pulses mean that the positions of the stuffing pulses are arranged at approximately equal intervals. For example, when the number of clocks is not divisible, there exists the case that the pulse interval of the trailing part of a frame becomes short. The pulse signal that the stuffing pulses are arranged at fixed intervals by the determination processing unit 442 is hereinafter referred to as "new gapped pulse". The new gapped pulse is one example of "second signal".

A signal P3 in FIG. 1 indicates the new gapped pulse. In the new gapped pulse, the stuffing pulses; that is, pulses each of which has a value of "Low" are allocated at fixed intervals in one frame.

In reference to FIG. 2, the following describes an example of equalizing pulse intervals. The determination processing unit 442 performs the above-mentioned processing by using the Cm value in the Cm pulse 103 and hence, the determination processing unit 442 receives a pulse signal such as a pulse signal 104 in which the stuffing pulses are arranged at fixed intervals in one frame.

The stuff determining unit 44 sequentially outputs a stuffing pulse at the position of a J-th clock in one frame or a pulse indicating the existence of data to the DPLL unit 5.

The DPLL unit 5 smoothes a pulse signal input from the stuff determining unit 44 to generate a clock in which pulses indicating the existence of data are equally arranged thus generating Tx_CLK that is a clock obtained by converting the frequency of the reference clock. Furthermore, the DPLL unit 5 outputs Tx_CLK to the reading unit 13. A signal P4 in FIG. 1 indicates Tx_CLK output from the DPLL unit 5. The DPLL unit 5 is one example of "clock signal generating unit". Furthermore, Tx_CLK is one example of "third signal".

Figure 5:
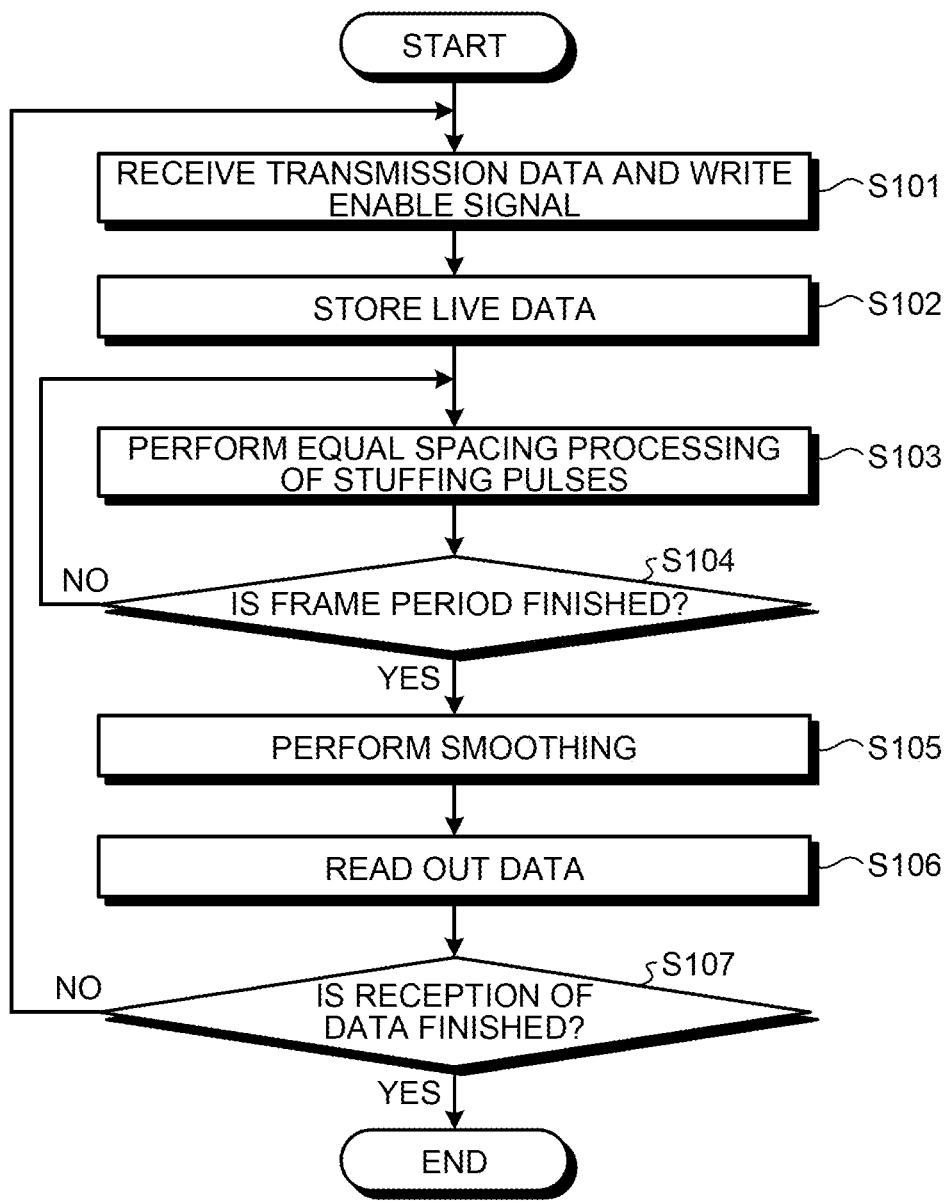
FIG. 5 is a flowchart illustrating receiving processing of data in the data receiver according to the first embodiment.

In reference to FIG. 5, the following describes the procedure of receiving processing of data in the data receiver according to the present embodiment. FIG. 5 is a flowchart illustrating receiving processing of data in the data receiver according to the first embodiment.

The writing unit 11 of the FIFO 1 receives transmission data and a write enable signal (Step S101). Furthermore, the writing unit 11 extracts live data from the transmission data by using the write enable signal to store the live data extracted in the storage unit 12 (Step S102).

The AND circuit 3 and the signal converting unit 4 uses the write enable signal and the reference signal to perform equal spacing processing of the stuffing pulses (Step S103). The following specifies the procedure of the equal spacing processing of the stuffing pulses.

The signal converting unit 4 determines whether or not a frame period is finished (Step S104). When the frame period is not finished (No at S104), the processing in the AND circuit 3 and the signal converting unit 4 returns to S103.

On the other hand, when the frame period is finished (Yes at S104), the DPLL unit 5 smoothes the new gapped pulses generated by the signal converting unit 4 to generate Tx_CLK that is a clock obtained by converting the frequency of the reference clock (Step S105). Furthermore, the DPLL unit 5 outputs Tx_CLK to the reading unit 13 of the FIFO 1.

The reading unit 13 receives Tx_CLK from the DPLL unit 5. Furthermore, the reading unit 13 uses Tx_CLK to read out live data from the storage unit 12, and outputs the data read out (Step S106).

The data receiver determines whether or not the reception of data is finished (Step S107). When the reception of data is not finished (No at S107), the processing in the data receiver returns to S101. On the other hand, when the reception of data is finished (Yes at S107), the data receiver finishes the reception processing of data.

The procedure of receiving processing in FIG. 5 is described below for the sake of convenience in the explanation as a series of processes from the reception of data to the equal spacing processing of the stuffing pulses, the smoothing processing, and the reading processing of data. However, the reception of data is continuously performed and a process is not necessarily performed after waiting for the finish of the other processes. Actually, the reception and storage of data are performed in parallel with the other processes.

Figure 6:
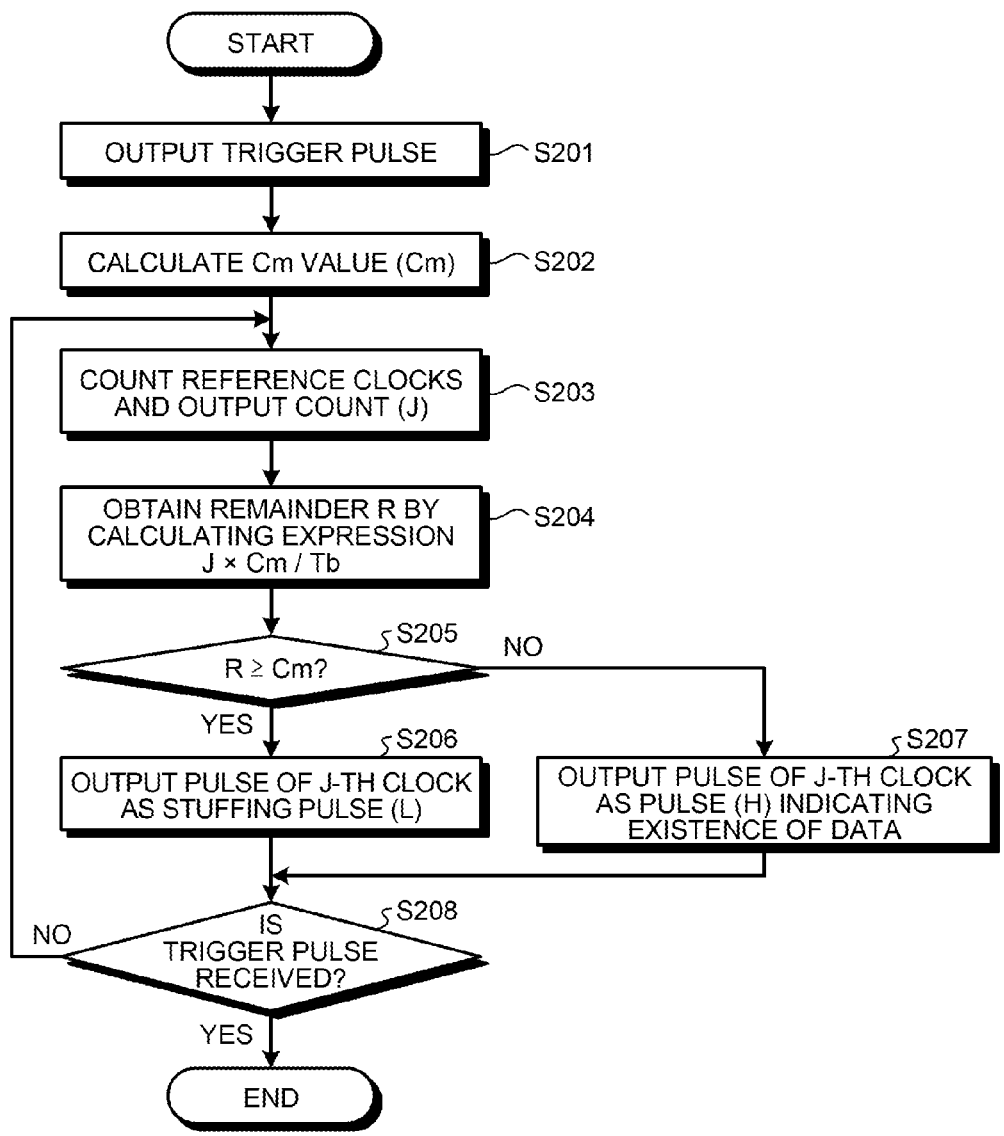
FIG. 6 is a flowchart illustrating smoothing processing of stuffing pulses according to the first embodiment.

In reference to FIG. 6, the following describes smoothing processing of stuffing pulses according to the present embodiment. FIG. 6 is a flowchart illustrating the smoothing processing of the stuffing pulses according to the first embodiment. The processing in FIG. 6 corresponds to S103 in FIG. 5.

The frame period extraction counter 42 counts reference clocks input one by one from the oscillator 2 until the number of the reference clocks reaches the total number of clocks per one frame. Furthermore, the frame period extraction counter 42 outputs, when the number of the clocks counted reaches the total number of clocks per one frame, a trigger pulse to the Cm-value calculation counter 43 and the stuff determining unit 44 (Step S201).

The Cm-value calculation counter 43 accepts the input of Cm pulses from the AND circuit 3. Furthermore, the Cm-value calculation counter 43 counts, when receiving the trigger pulse from the frame period extraction counter 42, the number of pulses indicating the position of data in the Cm pulses received from the AND circuit 3 to obtain a Cm value (Cm) (Step S202).

The clock counter 441 accepts the input of the reference clocks from the oscillator 2 and accepts the input of the trigger pulse from the frame period extraction counter 42. When receiving the trigger pulse, the clock counter 441 starts to count the number of the reference clocks received. Furthermore, the clock counter 441 outputs a count (J) resulting from the counting of the number of the reference clocks to the determination processing unit 442 (Step S203).

The determination processing unit 442 accepts the input of the number of clocks per one frame from the constant selecting unit 41. The determination processing unit 442 accepts the input of the count (J) from the clock counter 441. Furthermore, the determination processing unit 442 accepts the input of the Cm value (Cm) from the Cm-value calculation counter 43. In addition, the determination processing unit 442 calculates the expression of J×Cm/Tb to obtain a remainder (R) (Step S204).

Next, the determination processing unit 442 determines whether or not the remainder (R) is equal to or greater than the Cm value (Cm); that is, whether the expression of R≥Cm is satisfied (Step S205). When R≥Cm (Yes at S205), the determination processing unit 442 outputs the pulse of J-th clock in one frame as a stuffing pulse; that is, a pulse having the value of "Low", to the DPLL unit 5 (Step S206).

On the other hand, when R<Cm (No at S205), the determination processing unit 442 outputs the pulse of J-th clock in one frame as a pulse indicating the existence of data; that is, a pulse having the value of "High", to the DPLL unit 5 (Step S207).

The Cm-value calculation counter 43 and the stuff determining unit 44 determine whether the trigger pulse is received (Step S208). When the trigger pulse is not received (No at S208), the processing in the Cm-value calculation counter 43 and the stuff determining unit 44 returns to S203. On the other hand, when the trigger pulse is received (Yes at S208), the signal converting unit 4 finishes the smoothing processing of the stuffing pulses.

As explained heretofore, the data receiver according to the present embodiment generates a signal in which the stuffing pulses in the Cm pulse that is a pulse having a gap are equally rearranged, and the DPLL smoothes the signal in which the stuffing pulses are equally rearranged. Accordingly, the influence of the gap in the smoothing processing performed by the DPLL can be alleviated, thus alleviating the influence of the gap while achieving the high-speed pulling in.

For example, a two-step constitution is considered; that is, as a first step, when the data receiver is started, the DPLL is operated for a short period of time by using a high cut-off frequency of several hundreds of hertz for the purpose of pulling in to sufficiently pull in until the target frequency; as a second step, the processing of the DPLL advances to an operation using the low cut-off frequency.

In this case, when the high cut-off frequency of the first step is used, the equal spacing of the stuffing pulses according to the present embodiment is performed thus achieving the high-speed pulling in with a reduced effect of the gap. Furthermore, when the low cut-off frequency of the second step is used, the equal spacing of the stuffing pulses according to the present embodiment is performed to reduce the gap thus reducing noises even when the cut-off frequency is set higher (5 Hz or 10 Hz, for example). Accordingly, even when the cut-off frequency is set higher, it is possible to further quicken the convergence to the center frequency.

Furthermore, to consider a case where the equal spacing of the stuffing pulses can be highly maintained, even when not the two-step constitution but a one-step constitution is adopted, it is possible to achieve the high-speed pulling in and noise reduction.

Furthermore, the high-speed pulling in of the first step is unaffected by the gap thus reducing the occurrence of a large phase difference and avoiding the occurrence of communication failure even when the capacity of data to be stored in a FIFO is low. Furthermore, the FIFO can be made small thus miniaturizing circuits. In addition, the capacity of data to be stored in the FIFO for the appropriate operation of the FIFO can be lowered thus reducing a circuit delay in the FIFO.

[b] Second Embodiment

Figures 7, 8:
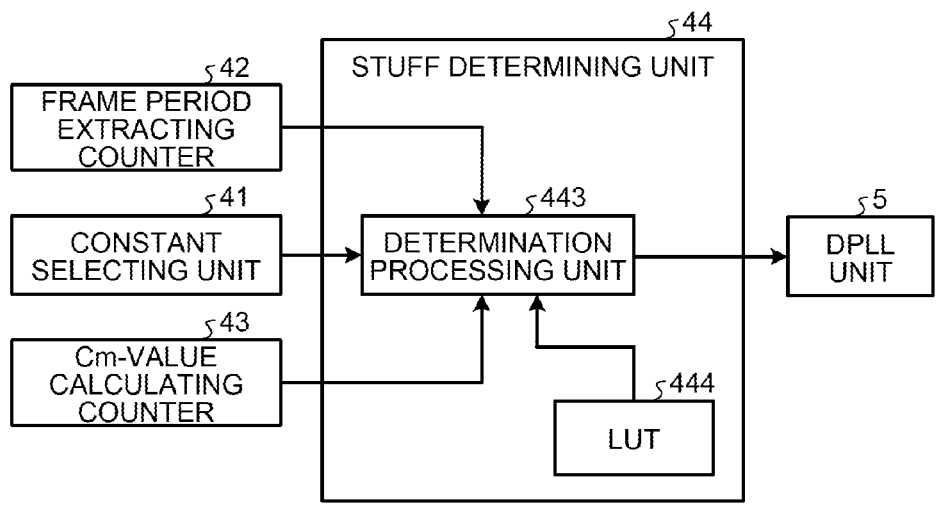
FIG. 7 is a block diagram illustrating the details of a stuff determining unit according to a second embodiment.
FIG. 8 is a view illustrating one example of a look-up table (LUT)

FIG. 7 is a block diagram illustrating the details of a stuff determining unit according to a second embodiment. A data receiver according to the present embodiment does not perform calculations as in the first embodiment but performs the equal spacing of stuffing pulses by using an LUT. Hereinafter, the stuff determining unit is mainly explained. The data receiver according to the present embodiment also has the respective units illustrated in FIG. 1 and FIG. 3 in the same manner as the case of the first embodiment. In the explanation made hereinafter, the explanations of units having functions same as those in the first embodiment are omitted.

The stuff determining unit 44 according to the present embodiment has, as illustrated in FIG. 7, a determination processing unit 443 and an LUT 444.

The LUT 444 is, as illustrated in FIG. 8, a table 200 in which signal patterns each corresponding to a Cm value are registered. FIG. 8 is a view illustrating one example of an LUT.

The table 200 registers therein signal patterns each corresponding to each of three kinds of Cm values. Here, when live data is transmitted or received, stuffing pulses assigned to the payload of transmission data are changed in assignment thus transmitting various kinds of data. Furthermore, when the assignment of the stuffing pulses comprises at least three different Cm values, it is possible to transmit any data. Here, when the LUT 444 stores therein, as in the table 200, signal patterns each corresponding to each of at least three kinds of Cm values, the LUT 444 is a table capable of specifying a signal pattern corresponding to transmission data transmitted.

In addition, in the present embodiment, the stuff determining unit 44 has a table corresponding to the total number of clocks in one frame as the LUT 444. For example, the LUT 444 includes a plurality of tables such as a table in the case where the total number of clocks in one frame is 17000, or a table in the case where the total number of clocks in one frame is 16000.

The determination processing unit 443 accepts the input of a trigger pulse from the frame period extraction counter 42. Furthermore, the determination processing unit 443 accepts the input of the total number of clocks in one frame from the constant selecting unit 41. In addition, the determination processing unit 443 accepts the input of a Cm value from the Cm-value calculation counter 43. The determination processing unit 443 selects a table from the LUT 444, the table being corresponding to the total number of clocks in one frame received. Next, The determination processing unit 443 acquires a signal pattern from the table selected, the signal pattern being corresponding to a Cm value received. For example, when the table selected is the table 200 illustrated in FIG. 8 and the Cm value received is Cm1 of a Cm value 201, the determination processing unit 443 acquires a signal pattern 211. Furthermore, when the Cm value received is Cm2 of a Cm value 202, the determination processing unit 443 acquires a signal pattern 212.

Furthermore, the determination processing unit 443 outputs the signal pattern acquired to the DPLL unit 5 in the wake of the reception of the trigger pulse. In this case, the output corresponding to the signal pattern becomes the new gapped pulse that is a pulse signal in which the stuffing pulses are equally spaced.

As explained heretofore, the data receiver according to the present embodiment performs the equal spacing of the stuffing pulses by using the LUT. Accordingly, it is unnecessary to perform the calculation for the equal spacing of the stuffing pulses as in the case of the first embodiment thus reducing the load of processing.

Hardware Configuration

Figure 9:
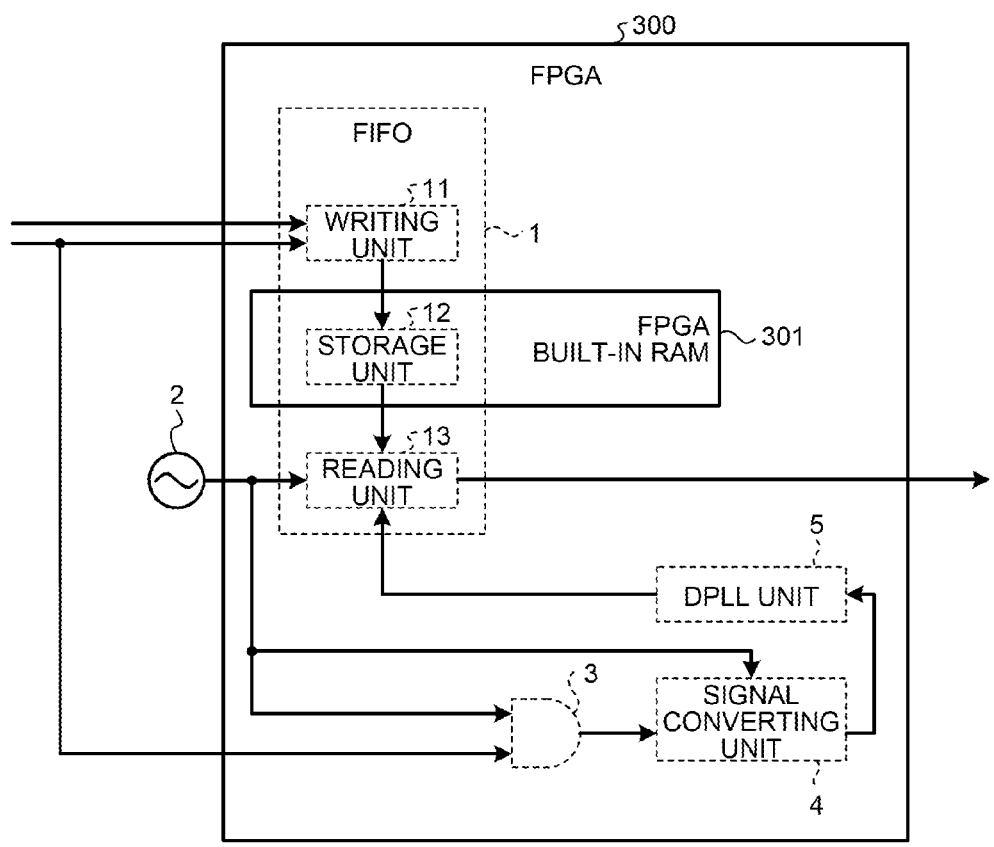
FIG. 9 is a view illustrating one example of the hardware configuration of the data receiver.

FIG. 9 is a view illustrating one example of the hardware configuration of the data receiver. The data receiver according to the present embodiment has an oscillator 2 and a field programmable gate array (FPGA) 300. Furthermore, the FPGA 300 has a built-in RAM 301.

In FIG. 9, for the sake of clarity, the respective parts that perform functions explained in the respective embodiments described above are encircled by dotted lines. The FPGA 300 provides the functions of the FIFO 1, the AND circuit 3, the signal converting unit 4, and the DPLL unit 5. In particular, the storage unit 12 is implemented by the built-in RAM 301.

According to one aspect of the data receiver, the DPLL device, and the method for controlling the data receiver that are disclosed in the present application, the effect that the high-speed pulling in and the reduction in noise of the reception data can be performed is achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data receiver comprising:
   a data receiving unit that receives transmission data including live data that is actual data to be transmitted or received and excessive data for adjusting a signal length, and stores the live data in a storage unit;
   a first signal generating unit that generates a first signal indicating positions of the live data and the excessive data in the signal length of the transmission data;
   a signal converting unit that generates a second signal indicating positions at which positions of the excessive data in the first signal are rearranged at certain intervals in the signal length;
   a digital phase locked loop (DPLL) unit that smoothes the positions of the live data in the second signal to generate a third signal indicating a timing to read the live data in the signal length; and
   a reading unit that reads the live data stored in the storage unit by using the third signal.

2. The data receiver according to claim 1, wherein the first signal and the second signal indicate the positions of the live data and the excessive data in the signal length in accordance with a clock of a reference frequency.

3. The data receiver according to claim 1, wherein
   the data receiving unit receives a position specifying signal indicating a position of the live data in the transmission data,
   the first signal generating unit generates the first signal indicating the positions of the live data and the excessive data in the signal length with pulses based on the live data and the position specifying signal, and
   the signal converting unit generates the second signal by arranging the pulses indicating the excessive data of the first signal in the signal length at certain intervals.

4. The data receiver according to claim 1, wherein the signal converting unit equally spaces the positions of the excessive data in the first signal to arrange the positions of the excessive data at the certain intervals.

5. The data receiver according to claim 1, wherein the signal converting unit counts a number from one to a total number of clocks of a reference frequency included in the signal length, multiplies a number of positions indicating the live data in the first signal by each number of counts, divides the multiplication result by the total number of clocks of the reference frequency included in a total length of the live data and the excessive data, and when a remainder of the division is equal to or greater than the number of the positions indicating the live data of the first signal, sets the position in the signal length corresponding to the counts to the position of the excessive data to rearrange the positions of the excessive data in the signal length at certain intervals.

6. The data receiver according to claim 1, wherein the signal converting unit stores therein signal patterns corresponding to a number of positions indicating the live data in the first signal in advance, specifies the signal pattern corresponding to the first signal generated by the first signal generating unit out of the signal patterns stored, and generates the second signal having the signal pattern specified.

7. A clock generation device comprising:
   a first signal generating unit that generates, in a signal length of transmission data including live data that is actual data to be transmitted or received and excessive data for adjusting the length of a signal, a first signal indicating the positions of the live data and the excessive data;
   a signal converting unit that generates a second signal indicating positions at which positions of the excessive data in the first signal are rearranged at certain intervals in the signal length; and
   a digital phase locked loop (DPLL) unit that smoothes the positions of the live data in the second signal to generate a third signal indicating the timing to read the live data in the signal length.

8. A method for controlling a data receiver, the method comprising:
   receiving transmission data including live data that is actual data to be transmitted or received and excessive data for adjusting length of a signal to store the live data in a storage unit;
   generating a first signal indicating positions of the live data and the excessive data in the signal length of the transmission data;
   generating a second signal indicating positions at which positions of the excessive data in the first signal are rearranged at certain intervals in the signal length;
   smoothing the positions of the live data in the second signal to generate a third signal indicating the timing to read the live data in the signal length; and
   reading the live data stored in the storage unit by using the third signal.

* * * * *